US006278467B1

(12) United States Patent
Kuwajima et al.

(10) Patent No.: US 6,278,467 B1
(45) Date of Patent: Aug. 21, 2001

(54) DISPLAY MEMORY CONTROL APPARATUS

(75) Inventors: Hidenori Kuwajima, Yamatokoriyama; Toshio Matsumoto, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/108,807

(22) Filed: Jul. 1, 1998

(30) Foreign Application Priority Data

Jul. 4, 1997 (JP) .................................................. 9-180069

(51) Int. Cl.[7] ...................................................... G06F 13/16

(52) U.S. Cl. .......................... 345/531; 345/565; 345/567; 345/537

(58) Field of Search .................................... 345/501–503, 345/520, 521, 526, 507, 509, 515, 513, 516, 511, 508

(56) References Cited

U.S. PATENT DOCUMENTS 5,559,952 9/1996 Fujimoto .............................. 345/511
5,572,655 * 11/1996 Tuljapurkar et al. ................ 707/526
5,625,386 * 4/1997 Howard et al. ....................... 345/201
5,696,947 * 12/1997 Johns et al. .......................... 345/517
5,767,865 * 6/1998 Inoue et al. .......................... 345/519
5,940,087 * 8/1999 Katsura et al. ...................... 345/511

FOREIGN PATENT DOCUMENTS 0 038 411 A2 10/1981 (EP) .
0 228 745 A2 7/1997 (EP) .
7-28990 1/1995 (JP) .

OTHER PUBLICATIONS

Goris et al., "A Configurable Pixel Cache for Fast Image Generation", IEEE Computer Graphics and Applications, U.S. IEEE Inc., New York, vol. 7, No. 3, Mar. 1, 1987, pp 24–32.

* cited by examiner

*Primary Examiner*—Ulka J. Chauhan
(74) *Attorney, Agent, or Firm*—Nixon & Vanderhye P.C.

(57) ABSTRACT

The present invention relates to a display memory control apparatus which can shorten a waiting time in making an access to a VRAM from a CPU without making large a circuit scale and causing an increase of power consumption. A data width of a VRAM is previously set to plural times as much as a data bus width of a CPU. A write data from the CPU is temporarily stored in a pre-buffer, and is transferred to one of data buffers included in a write buffer. The data buffer is specified by a low-order address. A VRAM control circuit can write all data or data of arbitrary combinations from data buffers into an address of VRAM specified by a high-order address buffer by one-time access.

5 Claims, 6 Drawing Sheets

DISPLAY MEMORY CONTROL APPARATUS

BACKGROUND OF THE INVENTION

1. Field of the Invention

The present invention relates to a display memory control apparatuses which is effectively used in information processing apparatuses such as various computers, in particular, in portable appliances in which it is important to lower the amount of power consumption.

2. Description of the Related Art

Information processing apparatuses such as a personal computer, a word processor and the like, have an image display device as a user interface. These information processing apparatuses are provided with a display memory (hereinafter, referred simply to as "VRAM") for storing data corresponding to an image. In the VRAM, a read for image display is regularly executed, and also, access from a central processing unit (hereinafter, referred simply as to "CPU") is irregularly executed. For this reason, access control is carried out by means of a display memory control circuit. In a conventional display memory control circuit, a periodical read access to the VRAM is preferentially executed in order to transmit display data to the display device. Therefore, in the case where the CPU makes an access to the VRAM, the CPU is in a wait state until timing other than the periodical read. Under such a control, the processing performance of CPU is not effectively exhibited, and this is one factor of lowering a processing speed.

FIG. 6 schematically shows the prior art which is disclosed in FIG. 1 of Japanese Unexamined Patent Publication JP-A 7-28990 (1995). As seen from FIG. 6, in the prior art, there are provided an address buffer 2 which stores a plurality of addresses at the time of writing from a CPU 1, and a data buffer 3 which stores a plurality of write data corresponding to these addresses. In order to control these address buffer 2 and data buffer 3, a buffer control circuit 4 is provided. A bus control circuit 5 executes control between each of the buffers and the CPU 1. The buffer control circuit 4 executes control for effectively writing the addresses and data stored in each of the address buffer 2 and the data buffer 3, into a VRAM 6.

In the prior art, the following proposal has been made. More specifically, a buffer for capturing write data to the VRAM 6 and addresses corresponding to the write data, is provided, and access control is made so as to obtain effective timing of writing the data in the VRAM 6. By doing so, it is possible to execute access processing without applying a load to the CPU 1 and depending upon the performance of VRAM 6. In a write sequence to the VRAM 6, first, when the bus control circuit 5 judges that the data is written from the CPU 1, the write data and address are stored in the data buffer 3 and the address buffer 2, respectively. At this time, the address and data mutually make one-to-one correspondence. The address buffer 2 informs the bus control circuit 5 about whether it is empty or full of the content stored as address, by using an internal control signal. And then, the bus control circuit 5 executes control between the CPU 1 and the VRAM 6 on the basis of the signal.

In the prior art, when the data is written in the VRAM 6 from the CPU 1, VRAM access is carried out the same number of times as CPU access; for this reason, the power of VRAM 6 itself is much consumed. Further, the required number of the address buffers 2 is equal to the number of data buffers 3; for this reason, this makes large a circuit scale, and also, is one factor of causing an increase in cost and power consumption. Further, in the case where a cache memory is applied as one method for speeding up a memory access, there is required a high speed buffer which can store data corresponding to a plurality of consecutive addresses; for this reason, it is inevitable that a circuit scale will be made larger, and that power consumption and cost will be increased.

SUMMARY OF THE INVENTION

An object of the invention is to provide a display memory control circuit which can control a CPU so that the CPU does not enter a wait state without making large a circuit scale and causing an increase of power consumption.

The present invention provides a display memory control apparatus for controlling access from a CPU and display access to a display memory having a data width plural times a data bus width of the CPU, the display memory control apparatus comprising:

buffer means for storing data in the same number of bits as the data width of the display memory;

buffer control means for controlling data transfer by a plurality of accesses between the CPU and the buffer means;

display control means for periodically reading data from the display memory and displaying the data; and access control means for making an access to the display memory while regulating read by the display control means from the display memory, and for executing data transfer along the bus width of the display memory between the buffer means and the display memory.

According to the invention, the buffer means is provided between the CPU and the display memory. The display memory has a data width plural times the data bus width of the CPU, and the buffer means can store data in the same number of bits as the display memory data width. Therefore, in the case where the access control means executes data transfer between the display memory and the buffer means, the data equivalent to one address of the display memory is transferred at one time. The transfer of the data equivalent to one address of the display memory between the buffer means and the CPU is executed by a plurality of accesses controlled by the buffer control means. It is not necessary to regulate the plurality of accesses in dependence on read by the display control means from the display memory. In the data transfer requiring an adjustment between the display memory and the buffer means, Data equivalent to data transfer by the plural-time accesses of CPU can be transferred at one time; therefore, it is possible to make small a frequency such that the CPU becomes in a wait state due to the adjustment, and to reduce a power consumed for making an access to the display memory.

According to the invention, by using the VRAM having a multi-bit bus width with respect to the data bus width of the CPU, write data is stored in the VRAM by a fewer number of VRAM accesses. Therefore, it is possible to shorten a waiting time of CPU, and to reduce current consumption of the VRAM itself. Further, as compared with a construction of a general buffer or cache memory, in the write buffer, as many addresses as areas may not be stored therein, so that a circuit scale can be made small.

Further, the invention provides a display memory control apparatus for writing data into a display memory having data lines plural times data lines for making a connection with a CPU, comprising:

a pre-buffer capable of storing addresses and data in writing data into the display memory from the CPU, for deriving a pre-buffer effective flag used as a signal for identifying whether or not addresses and data are stored therein;

a write buffer capable of storing data numerically corresponding to data lines of the display memory while dividing the data between a plurality of areas, for deriving a plurality of effective flags used as a signal for identifying whether or not effective data is stored therein corresponding to respective areas constituting the plurality of areas;

a high-order address buffer for storing a high-order address data of a predetermined number of bits on a high-order side of address;

a low-order address decoder for decoding address of a predetermined number of bits on a low-order side of address;

a high-order address comparator circuit for making a comparison between the high-order address data stored in the high-order address buffer and the high-order address of addresses of the pre-buffer;

an access control circuit for controlling a write operation to the write buffer;

a display control circuit for periodically executing read of display data from the display memory; and a display memory control circuit for controlling read and write of the display memory via the data buses corresponding to the number of display data lines, the access control circuit referring the pre-buffer effective flag and effective flags, and writing data stored in the pre-buffer into a write buffer area determined on the basis of a result of comparison between the high-order address comparator circuit and an decode output of the low-order address decoder, and further, controlling the display memory control circuit so as to write data stored in the write buffer into the display memory in the case where a predetermined condition is established.

According to the invention, the display memory has data lines which outnumbers the data lines for connecting the CPU and the display memory control apparatus. By using the display memory, a multi-bit data requiring plural-time writing operations from the CPU is temporarily stored in the write buffer included in the display memory control apparatus, and is controlled by means of the access control circuit so as to execute a write operation by one-time access to the display memory. Further, data, which is to be written in the write buffer by plural-time writing operations of the CPU, can be written in the display memory by one-time access; therefore, it is possible to make small a frequency with which the CPU waits for the write operation due to the periodical read of display data to the display memory, and to reduce the number of power consumption by the writing operation.

Further, the invention is characterized in that the access control circuit controls the display memory control circuit so as to immediately write data into the display memory from the write buffer in the case where the plurality of effective flags of the write buffer all indicate the presence of effective data.

According to the invention, when data is stored in all the areas of the divided write buffer is divided, the data write to the display memory is executed at once. Therefore, it is possible to shorten a waiting time of access by the CPU due to a full state of the write buffer.

Further, the invention is characterized in that the access control circuit controls the display memory control circuit so as to write data stored in the write buffer into the display memory in the case where a read instruction of storage contents is given to the display memory from the CPU in a state that effective data is stored in the write buffer.

According to the invention, in the case where the CPU executes the read of display memory in a state that the effective flag of the write buffer is effective, all of data stored in the write buffer is controlled by means of the access control circuit so as to be written into the display memory. Further, all data stored in the write buffer is data which ought to be written into the display memory in the CPU, and then, the data is read after being written into the display memory, so that data mismatch can be prevented. Further, it is possible to use the read instruction from the CPU as an instruction to write the data stored in the write buffer into the display memory.

Further, the invention is characterized in that the display control apparatus further comprises a timer for counting a predetermined cycle time, wherein the access control circuit controls the display memory control circuit so as to write data stored in the write buffer into the display memory in the case where effective data is stored in the write buffer when the timer counts a given time.

According to the invention, in the case where the timer counts a given time in a state that the effective flag of the write buffer is effective, effective data stored in the write buffer is written into the display memory; therefore, it is possible to shorten the time taken until display data is actually written into the display memory so as to display the data after data has been written into the write buffer from the CPU.

Further, the invention is characterized in that the access control circuit controls the display memory control circuit so as to write data stored in the write buffer into the display memory in the case where a result from the comparison of the high-order address comparator circuit is that the high-order address stored in the high-order address buffer does not coincide with the high-order address of addresses of the pre-buffer, in a state that the effective flag of the write buffer and the pre-buffer effective flag of the pre-buffer indicate that effective data is present.

According to the invention, in the case where the high-order address of addresses stored in the write buffer and the high-order address of addresses stored in the pre-buffer are compared with each other and a result from the comparison is that the high-order addresses do not coincide with each other, in a state that both the effective flag of the write buffer and the pre-buffer effective flag of the pre-buffer indicate that effective data is present, the effective data stored in the write buffer is controlled by means of the access control circuit so as to be written into the display memory. Further, even in a state that the data stored in the write buffer is not identical to the data width of the display memory, the CPU can write data into different addresses of the display memory. Therefore, it is possible to make lower a frequency of giving a waiting instruction with respect to the access by the CPU.

According to the invention, in particular, in a system configuration of portable appliances in which it is important to lower power consumption, no complicated software process is required, and unnecessary waiting time is eliminated while maintaining low power consumption effect. Therefore, high speed processing by CPU can be maintained.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
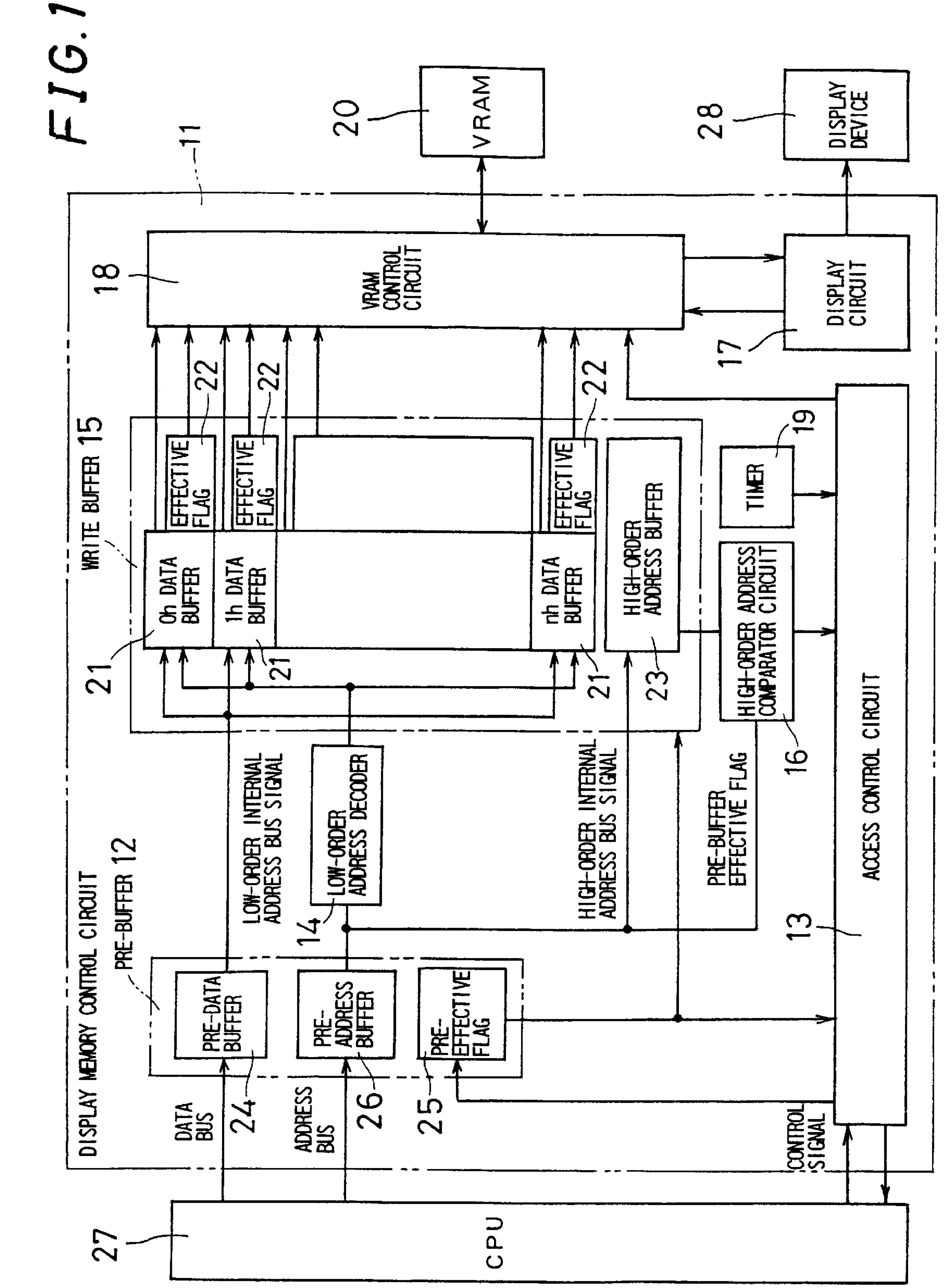
FIG. 1 is a block diagram showing an electrical configuration of a display memory control circuit 11 according to a first embodiment of the invention.

Now referring to the drawings, preferred embodiments of the invention are described below.

FIG. 1 shows a configuration of a display memory control circuit 11 according to a first embodiment of the invention. The display memory control circuit 11 comprises a pre-buffer 12, an access control circuit 13, a low-order address decoder 14, a write buffer 15, and a high-order address comparator circuit 16, a display circuit 17, a VRAM control circuit 18 and a timer 19, and executes a control with respect to a VRAM 20. The write buffer 15 comprises a plurality of data buffers 21, and shows whether or not an effective data is stored for each data buffer, with the use of an effective flag 22. Further, the write buffer 15 is provided with a high-order address buffer 23. The pre-buffer 12 is provided with a pre-data buffer 24 for storing data, a pre-effective flag 25 showing whether or not effective data is stored in the pre-data buffer 24, and a pre-address buffer 26 storing addresses.

A data width of the VRAM 20 is n-times as much as a data bus width of a CPU 27. Each data buffer 21 included in the write buffer 15 has the number of bits corresponding to the data bus width of the CPU 27. As the data buffer 21, n-tuple data buffers are provided in the write buffer 15, and the whole number of bits is identical with the data width of the VRAM 20. The data and addresses outputted from the CPU 27 are transmitted to the pre-data buffer 24 and the pre-address buffer 26, respectively. The information of the pre-effective flag 25 is effective in the case where data is stored in the pre-data buffer 24 and is not still written in the data buffer 21. On the other hand, the information of the effective flag 22 is effective in the case where data is stored in the corresponding data buffer 21 and is not still written in the VRAM 20.

The access control circuit 13 executes write control and read control of internal circuits and control of a wait signal given to the CPU 27 in accordance with the content accessed from the CPU 27. The low-order address decoder 14 decodes a low-order address from address information of the pre-address buffer 26. The high-order address comparator circuit 16 makes a comparison between the high-order address buffer 23 of the write buffer 15 and a high-order address of the pre-address buffer 26 of the pre-buffer 12. The display circuit 17 periodically reads out display data from the VRAM 20, and then, displays the data with use of a display device 28 such as a liquid crystal display (LCD) and a cathode-ray tube (CRT) or the like. The VRAM control circuit 18 executes access control to the VRAM 20.

First, the VRAM 20 to be used will be described before the display memory control circuit 11 is described in detail. With regard to VRAM 20 used in this embodiment, it is premised that the following matters. More specifically, a data bit width corresponding to one address of the VRAM 20 has a multi-bit, and only part of the multi-bit data may be read or written. In the following explanation, a data bit width of the VRAM 20 is determined as “a”, and the least unit of the number of bits in reading or writing of part of data is determined as “b”.

In this embodiment, a data bus width of one address, that is, “a” is 128 bits. Thus, it is possible to read or write the maximum 128-bit data by one-time access to the VRAM 20. Further, “b” is 8 bits. The 128-bit data bus is divided into 16 elements for each 8-bit, and it is possible to read or write arbitrary one of 16 elements, that is, only 8-bit. Also, it is possible to read or write a plurality of elements having a combination of the arbitrary one element, that is, data for integral multiple of 8 bit.

On the basis of the construction of the VRAM 20, the construction of the write buffer 15 is determined. Thus, to the VRAM 20, the data buffers 21 need to be provided in number so that the whole number of bits is identical to the data width of the VRAM 20. Namely, in this embodiment, a 128-bit data buffer 21 is provided. Further, the 128-bit data buffer 21 is divided into small areas, that is, a/b (=n−tuple) data buffers 21 individually having the number of bits “b”, and control is made for each small area. Therefore, in this embodiment, the 128-bit data buffer is divided into 16 small areas for each 8-bit. Also, in this embodiment, a/b, that is, 16 effective flags 22 exist therein so as to make one-to-one correspondence with respect to 16 small areas.

The following is an explanation about the case where the display memory control circuit 11 of this embodiment is connected to the CPU 27 having 8-bit data bus width. However, the data bus width of CPU 27 is not specially limited to the 8-bit, and the CPU 27 may have 16-bit, 32-bit and 64-bit data bus width. In such a case, the basic configuration of the control circuit 11 is unchanged although a minor change is made in the number of bits of the pre-data buffer 24 of the pre-buffer 12 described later and in a control method of the effective flags 22 included in the write buffer 15.

The pre-buffer 12 includes the pre-data buffer 24 having the same number of bits as the data bus width of the CPU 27. Further, the pre-buffer 12 comprises the pre-address buffer 26 for storing addresses from the CPU 27 and the pre-effective flag 25. In this embodiment, the data bus width of the VRAM 20 is 128-bit, and the data bus width of the CPU 27 is 8-bit, and thus, the data bus width of the VRAM 20 is 16 times as much as that of the CPU 27. From the aforesaid relationship, an address of the VRAM 20 is determined by a high-order address except low-order 4-bit (16 times) of addresses of the CPU 27. Therefore, the VRAM 20 and the CPU are connected in the following manner. More specifically, of addresses stored in the pre-address buffer 26, a high-order address except the low-order 4-bit is stored in the next-stage high-order address buffer 23. The low-order 4-bit of the address from the CPU 27 stored in the pre-address buffer 26 is used in the control of the effective flags 22 via the low-order address decoder 14.

In the sequence when the CPU 27 writes data into the VRAM 20, in order to capture write data from the CPU 27, the pre-effective flag 25 is in an invalid state, that is, the pre-data buffer 24 must be in an empty state. In this state, when write access is executed from the CPU 27, the access control circuit 13 makes no limitation to the CPU 27, and then, stores a write address in the pre-address buffer 26 of the pre-buffer 12 and stores a write data in the pre-data buffer 24, and thus, makes effective the pre-effective flag 25 of the pre-buffer 12.

As described later, when the write data of the pre-buffer 12 is stored in the write buffer 15, the pre-effective flag 25 returns to the invalid state, so that a write data can be again captured from the CPU 27. In the case where the pre-effective flag is effective, when write access is further made from the CPU 27, the access control circuit 13 outputs a wait signal to the CPU 27 until the pre-effective flag 25 becomes invalid, and thus, time required to capture the write data is kept.

The access control circuit 13 makes a judgment on whether or not the write data of the pre-buffer 12 is written in the write buffer 15 on the basis of information of the pre-effective flag 25. In the case where pre-effective flag 25 is effective and any of the effective flags 22 of the write buffer 15 is in an invalid state, that is, the write buffer 15 is in an empty state, the write data can be moved from the pre-buffer 12 to the write buffer 15. Further, even though the pre-effective flag 25 is effective and any of the effective flags 22 is in an effective state, when the addresses of the high-order address buffer 23 and the pre-address buffer 26 are compared, and a result that the addresses coincide with each other is obtained from the comparison therebetween, the write data can be moved from the pre-buffer 12 to the write buffer 15.

To move write data means the following matter; more specifically, the high-order address data of the pre-address buffer 26 and the write data of the pre-data buffer 24 is stored in the corresponding data buffer 21 of the write buffer 15 on the basis of the decode result of the high-order address buffer 23 of the write buffer 15 and the high-order address decoder 14. When this process ends, the pre-effective flag 25 of the pre-buffer 12 is returned to an invalid state.

In this embodiment, according to the construction of the write buffer 15, the high-order address comparator circuit 16 can make a comparison between data of bit widths except the low-order 4-bit of the CPU address, and compare respective address values of the pre-address buffer 26 and the high-order address buffer 23. And then, on the basis of whether or not the aforesaid address values conincide with each other, the access control circuit 13 executes the following control. At this time, in the case where the address values are consitent with each other, the write data stored in the pre-buffer 12 is identical with the address to the VRAM 20 of the write data already stored in the write buffer 15, and therefore, it is possible to write the write data into the VRAM 20 by one-time access to the VRAM 20. Also, at this time, the write data of the pre-buffer 12 is moved to the write buffer 15 regardless of effective flags 22 of the write buffer 15. In such a case, even in the case where data write of plural times is made from the CPU 27, it is possible to write data into the VRAM 20 by one-time write operation, so that current consumption can be reduced.

As described before, the data buffers 21 of the write buffer 15 are 16 small areas for each 8-bit. Of 16 small areas, one to which input should be made is determined according to the decode result of the low-order address decoder 14. The low-order address decoder 14 decodes the low-order 4-bit of CPU address. With respect to the data buffer 21 having the effective flag 22 which is in an effective state, data change is made by the write buffer 15, not by the VRAM 20.

In a state that the pre-effective flag 25 is effective and any of 16 effective flags 22 of the write buffer 15 are effective, in the case where a result from the comparison between the high-order address stored in the high-order address buffer 23 and the high-order address stored in the pre-address buffer 26 is that the high-order addresses do not coincide with each other, it is impossible to move write data to the write buffer 15. In such a case, as described later, there is a need of storing write data of the write buffer 15 in the VRAM 20, and making invalid all effective flags 22, that is, making empty the write buffer 15.

The high-order address buffer 23 is a single unit unlike the plurality of data buffers 21; therefore, this serves to make small a circuit scale as compared with the buffer of the prior art described before. In the case where the high-order addresses stored in the high-order address buffer 23 and the pre-address buffer 26, that is, VRAM addresses are different, it is impossible to write these address data into the VRAM 20 by one-time VRAM access; for this reason, low power consumption is not achieved. Therefore, in software, it is effective in low power consumption to make a program to execute a write process such that the same VRAM address continues.

The access control circuit 13 stores write data in the VRAM 20 at predetermined timing in the case where any of the effective flags 22 of the write buffer 15 are effective. Every write access to the VRAM 20, a consumptive current of the VRAM 20 itself flows; for this reason, the timing should be predetermined so as to store write data in the write buffer 15 as much as possible and to reduce the number of VRAM access times. The details of this timing will be described in other embodiments.

The display circuit 17 periodically makes a read access to the VRAM 20 in order to transmit display data to the display device 28; for this reason, the display circuit 17 must make a write access to the VRAM 20 at timing except this read cycle (hereinafter, referred to as display cycle). In the case where there is a conflict between accesses, timing control is executed by means of the VRAM control circuit 18. Also, the number of bits of data read by the display circuit 17 in one-time display cycle is plural times as much as the number of bits required for display of one picture element by the display device 28. The display circuit 17 transmits data read in one-time display cycle to the display device 28 repeatedly several times. For this reason, the display cycle is plural times as much as a dot cycle of display for each picture element. Thus, it is possible to use a general memory as a display memory even though access is not carried out at so high speed.

The procedures for storing write data in the VRAM 20 from the write buffer 15 are executed in the following manner. First, the access control circuit 13 instructs the VRAM control circuit 18 to store write data in the VRAM at predetermined timing. And then, the VRAM control circuit 18 determines whether to make write access to a particular part or all of multi-bit data of the VRAM 20 on the basis of a state of the effective flags 22 of the write buffer 15. After determined, the VRAM control circuit 18 executes write access to the VRAM 20 at timing except the display cycle, and then, stores the write data of the write buffer 15 in the VRAM 20. When this process ends, the VRAM control circuit 18 returns all effective flags 22 to an invalid state, and again, permits moving the write data from the pre-buffer 12 to the write buffer 15.

By using the VRAM 20 having a multi-bit bus width in this manner, it is possible to store the write data in the VRAM 20 a smaller number of VRAM access times than the number of CPU access times. Thus, the current consumption of the VRAM 20 itself can be reduced.

Further, the address buffer 23 of the write buffer 15 may not be provided by the number equivalent to the number of data buffers 21, so that a circuit scale can be made small.

In second to fifth embodiments of the invention, the circuit configuration and write sequence of the display memory control apparatus 11 is basically the same as those described in the first embodiment. For these second to fifth embodiments, there is a description on timing of effectively writing data into the VRAM 20 in the case where any of effective flags 22 of the write buffer 15 are in an effective state.

Figure 2:
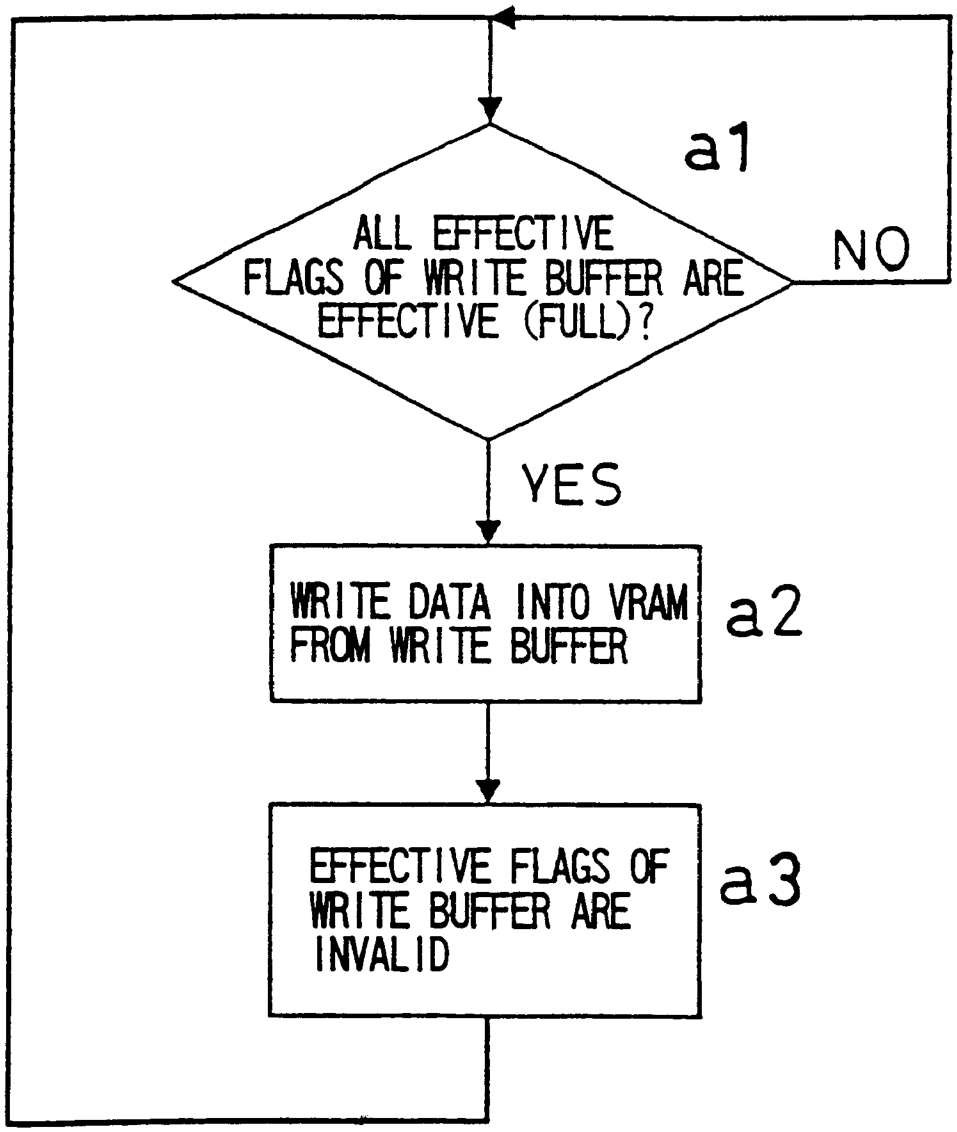
FIG. 2 is a flowchart showing a process according to a second embodiment of the invention.

FIG. 2 shows VRAM write timing according to the second embodiment of the invention. In step al, the access control circuit 13 makes a decision on whether or not all the effective flags 22 of the write buffer 15 are effective. In step a2, the access control circuit 13 instructs the VRAM control circuit 18 to write data for the first time when the write buffer 15 is in a full state, and then, the write data is stored in the VRAM 20. In general, software does not execute wasteful flow such that overwrite is continuously made on the same coordinate two times or more. Thus, when the write buffer 15 becomes in a full state, in the next write data from the CPU 27, there is the high possibility that the high-order address of the write buffer 15 has been varied. Therefore, since there is no need of waiting for the timing of the writing operation from the write buffer 15 to the VRAM 20 any more, data is immediately written into the VRAM 20.

In step a2, VRAM writing is immediately executed when the write buffer 14 is in a full state, and in step a3, the effective flag 22 is kept invalid. By doing so, in the next write access from the CPU 27, even if effective write data is stored in the pre-buffer 12, it is possible to immediately transfer the write data to the write buffer 15, so that the write data can be immediately written into the pre-buffer 12 regardless of high-order address.

Timing control of repeating processes from step a1 to step a3 is executed, and thereby, it is possible to capture write data without unnecessarily keeping the CPU 27 waiting. Therefore, this serves to achieve a speedup of the entirety of system into which the display memory control circuit 11 is incorporated.

Further, by executing this timing control, it is possible to store the most numerous CPU write data in the VRAM 20 by the least number of VRAM access times. This embodiment defines a data bus width of the CPU 27 as 8 bits and defines one address data width of the VRAM 20 as 128 bits. Thus, it is possible to store data equivalent to the maximum 16 times CPU access in the VRAM 20 as write data by one-time VRAM access. Therefore, the number of write access times to the VRAM 20 is restricted to the minimum, so that a current consumption of the VRAM itself can be reduced.

Figure 3:
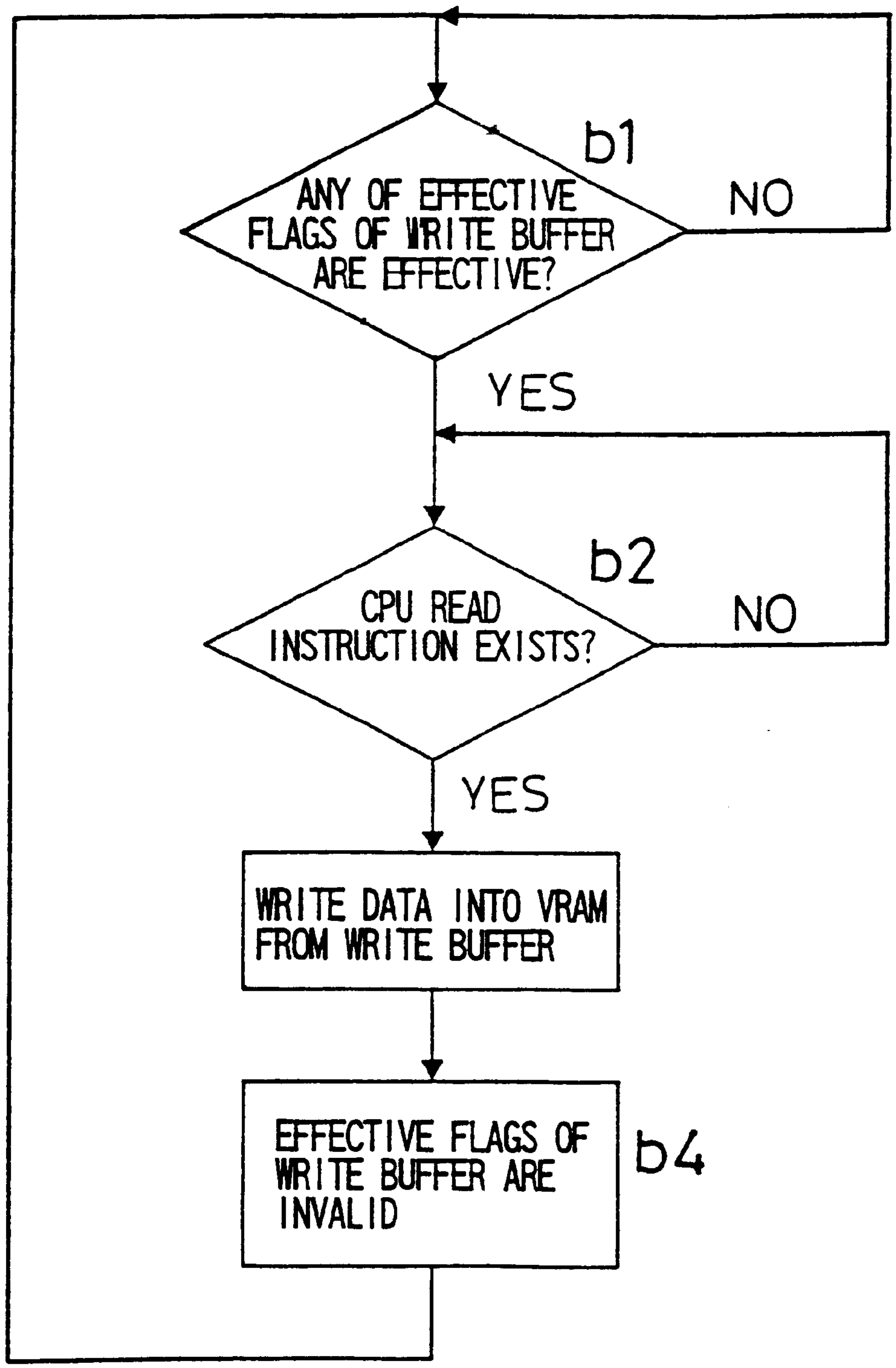
FIG. 3 is a flowchart showing a process according to a third embodiment of the invention.

FIG. 3 shows VRAM access timing according to the third embodiment of the invention. In this third embodiment, VRAM write timing means control timing of first instructing the VRAM control circuit 18 to write data and storing the write data in the VRAM 20 in the case of reading a VRAM data from the CPU in a state that write data is stored in the pre-buffer 12 or the write buffer 15.

In step b1, waiting is made till any of effective flags 22 of the write buffer 15 is effective or the pre-effective flag 25 of the pre-buffer 12 is effective, that is, write data becomes in a state of being stored in the write buffer 15 or the pre-buffer 12. In step b2, the sequence proceeds to step b3 in the case where the CPU 27 executes read access to the VRAM 20. There is the possibility that this read access is still a read instruction to write data of VRAM address included in the write buffer 15, or write data of the pre-buffer 12. The write data is still not stored in the VRAM 20; for this reason, it is impossible to immediately read the write data from the VRAM 20.

Also, depending upon a circuit configuration, it is possible to directly read data from the pre-data buffer 24 of pre-buffer 12 or the data buffer 21 of the write buffer 15. In order to achieve this, the address comparator circuit and the like need to be additionally provided. This causes an increase of a circuit scale; therefore, there is a problem of power consumption increase.

In this third embodiment, accordingly, when receiving a read instruction from the CPU 27, in step b3, the access control circuit 13 instructs the VRAM control circuit 18 to immediately store write data stored in the pre-buffer 12 or the write buffer 15 in the VRAM 20. At this time, the access control circuit 13 outputs a wait signal to the CPU 27 at once so as to keep a time till read data is prepared.

In the case of executing a read access to the VRAM 20 from the CPU 27 in a state that the pre-effective flag 25 of the pre-buffer 12 is effective, the write data of the pre-buffer 12 is transferred to the write buffer 15, and thereafter, the access control circuit 13 instructs the VRAM control circuit 18 to write the data of the write buffer 15 into the main body of VRAM 20.

In step b4, as soon as the pre-effective flag 25 of the pre-buffer 12 and all of the effective flags 22 of the write buffer 15 becomes invalid, the access control circuit 13 immediately instructs the VRAM control circuit 18 to read VRAM data of a specified address. And then, the read cycle controlled by the VRAM control circuit 18 ends, and thereafter, the access control circuit 13 outputs read data to the CPU 27, and cancels the wait signal. Data read from the VRAM 20 in the read cycle is temporarily stored in the data buffers 21 of the write buffer 15, and thereafter, is transmitted to the CPU 27 for each number of bits corresponding to data bus width. The read data does not always need to be stored in the data buffers 21 as described below.

As seen from the aforesaid description, in the case where read is executed from the CPU 27 in a state that data is stored in the pre-buffer 12 and the write buffer 15, write data is immediately stored in the VRAM 20, and it is possible to restrict a wait time generated due to a read instruction to the maximum without making a circuit scale large. Therefore, this serves to achieve a speedup of the entirety of system into which the display memory control circuit 11 is incorporated.

Further, by employing this control method, in the case where the write data of the write buffer 15 need to be immediately written into the VRAM 20, that is, only when the immediate display of the write data is desired, the read instruction is executed. Whereby write timing control to the VRAM 20 is performed, so that power consumption of the VRAM 20 itself can be effectively reduced in software control. In this case, the CPU 27 executes the read instruction for the purpose of timing control; for this reason, the CPU disregards read data. Therefore, the data of VRAM 20 does not always need to be read in the CPU 27 with the use of the write buffer 15 or the like. Namely, in the case where the read data may not be required on the system depending on the uses of the VRAM 20, it is not necessary to return the read data to the CPU 27.

Figure 4:
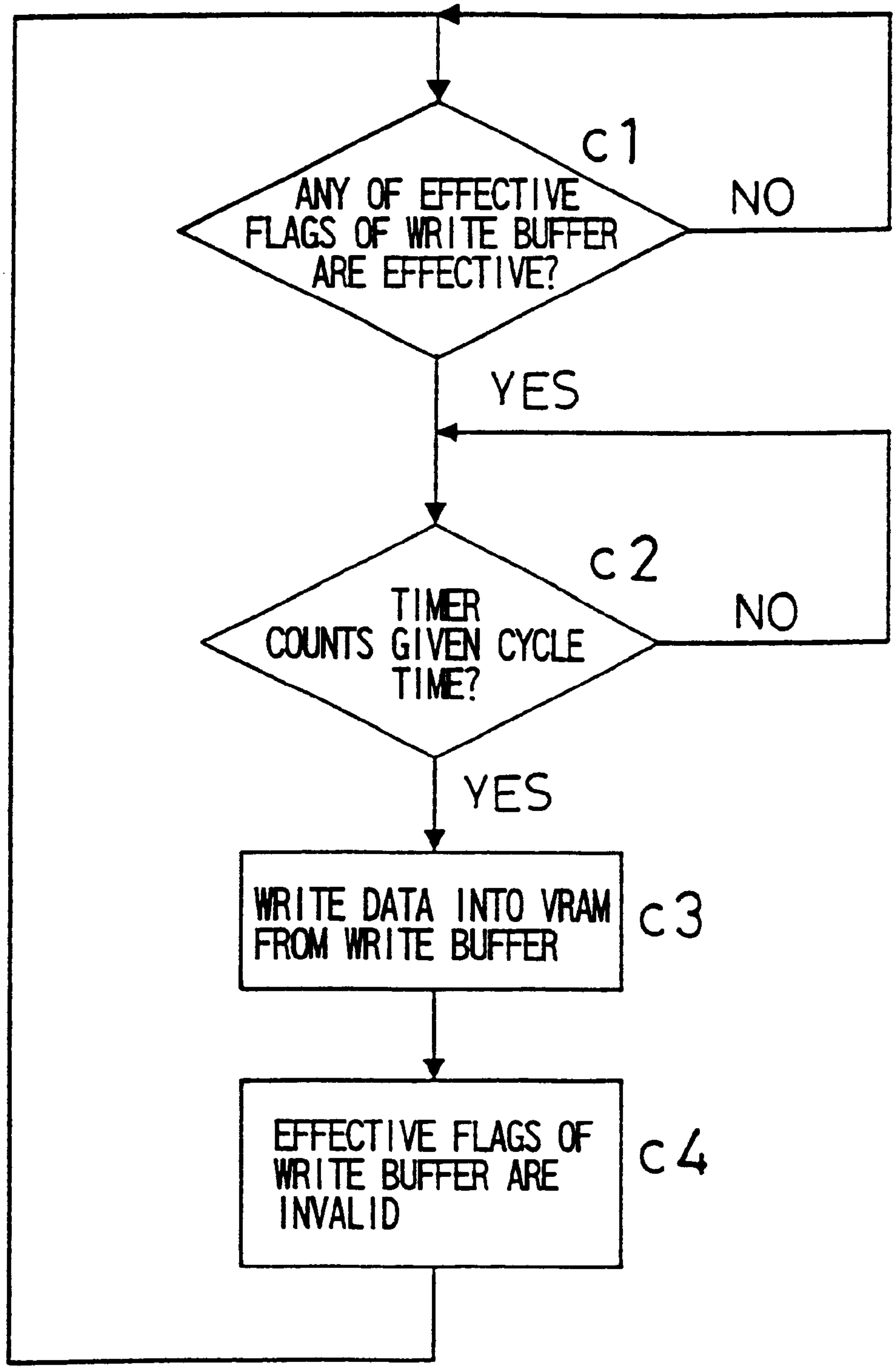
FIG. 4 is a flowchart showing a process according to a fourth embodiment of the invention.

FIG. 4 shows VRAM access timing according to the fourth embodiment of the invention. In a state that write data is stored in the write buffer 15, in the case where write data having of the same VRAM address is written in the VRAM from the CPU 27, by simultaneously writing the two write data together in the VRAM 20, it is possible to reduce the power consumption of the VRAM 20. Therefore, as described in the second embodiment shown in FIG. 2, it is preferable to write the write data in the VRAM 20 after the write buffer 15 becomes in a full state.

However, even in the state that the write data is stored in the write buffer 15 as described above, the write data is not reflected on the display device 28 so long as the write data is not stored in the VRAM 20. Thus, in such a state, unless write and read accesses are made from the CPU 27, write access is not made to the VRAM 20. For this reason, display data is not reflected, causing a missing part of display.

In this fourth embodiment, in order to solve the aforesaid problem, in the case where write data is stored in the write buffer 15 in step c1, after a predetermined time has elapsed in step c2, the access control circuit 13 executes a process for transferring the write data from the write buffer 15 to the VRAM 20. In step c4, the effective flag 22 of the write buffer 15 is made invalid, and the sequence returns to step c1.

The time 19 is previously set so as to count a predetermined cycle time. If the preset time is too shorter, surplus VRAM accesses are executed. In this embodiment, in order to make full the write buffer 15 by the CPU 27, 16-bus cycle time of the CPU 27 is required. Thus, the preset cycle time should be at least longer than the 16-bus cycle time. After the given time elapsed, the access control circuit 13 instructs the VRAM timing control circuit 18 to write the write data of the write buffer 15 into the main body of VRAM 20.

In this manner, it is possible to store the write data in the VRAM 20 at given timing even in the case where no write and read accesses are made from the CPU 27 in a state that write data is stored in the write buffer 15. Whereby the CPU 27 has no need of giving an instruction purely for making a write access to the VRAM 20, and surplus read and write accesses of the CPU 27 can be deleted from programs. Therefore, software control can be simplified.

Figure 5:
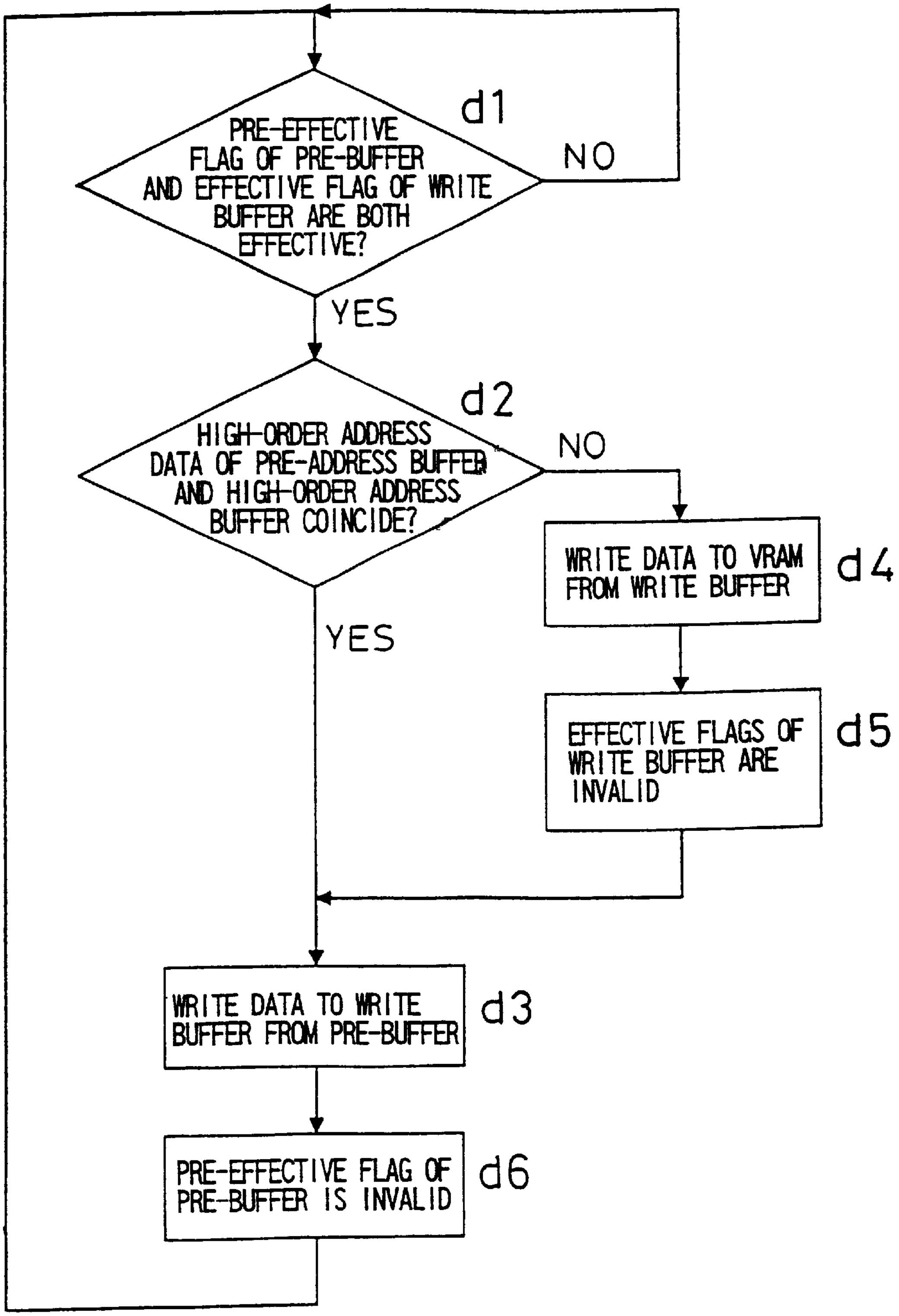
FIG. 5 is a flowchart showing a process according to a fifth embodiment of the invention.
Figure 6:
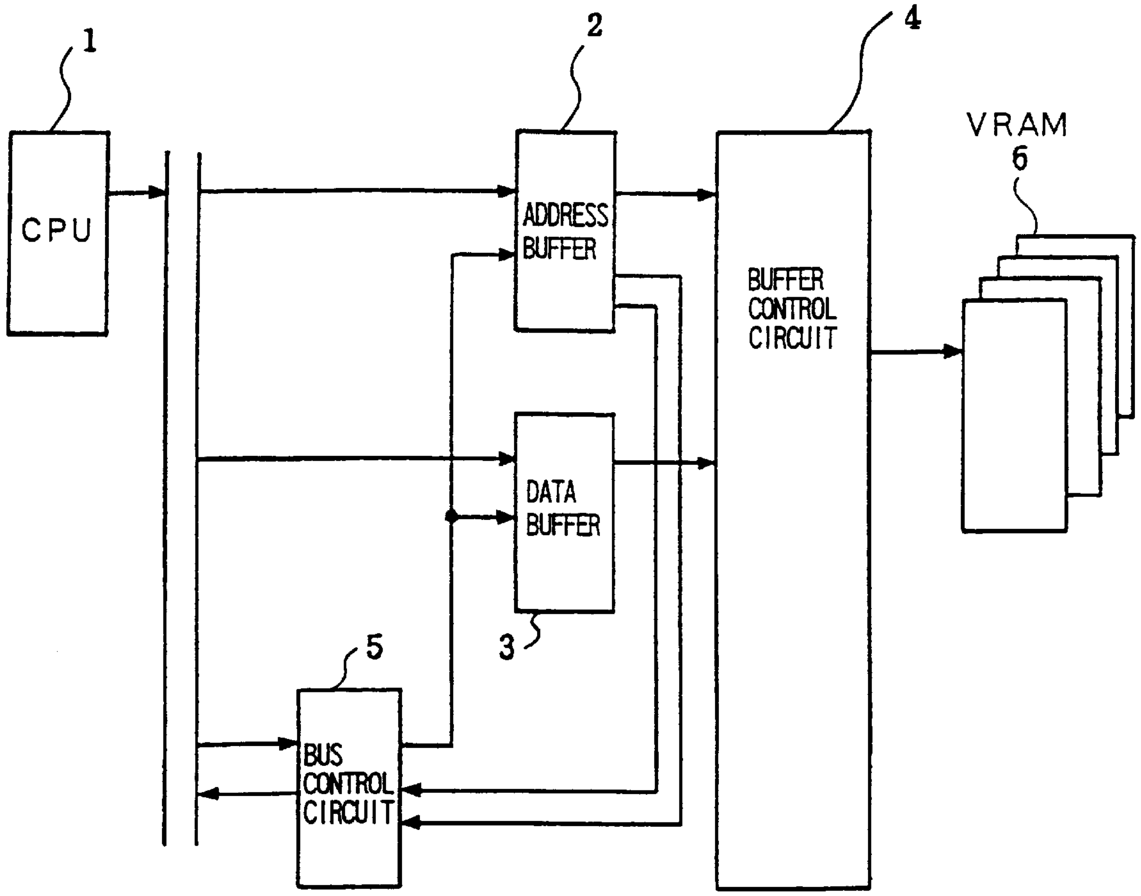
FIG. 6 PRIOR ART
FIG. 6 is a block diagram schematically showing an electrical configuration of the prior art.

FIG. 5 shows VRAM access timing according to the fifth embodiment of the invention. In this fifth embodiment, in the case where a write access is made to the VRAM 20 from the CPU 27 in a state that any of effective flags 22 of the write buffer 15 is effective in step d1, that is, in the case where write data is stored in the pre-buffer 12, the access control circuit 13, in step d2, makes a comparison between a high-order address of the pre-address buffer 26 and a high-order address of the high-order address buffer 23 with the use of the high-order address comparator circuit 16. In the case where a result from the comparison is that the high-order addresses coincide with each other, the write data stored in the pre-buffer 12 is identical to the VRAM address of the write data already existing in the write buffer 15; therefore, it is possible in step d3 to transfer the write data of the pre-buffer 12 to the write buffer 15.

However, in the case where a result from the comparison between the high-order address of the pre-address buffer 26 and the high order address stored in the high-order address buffer 23 is that the high-order addresses do not coincide with each other, it is impossible to transfer the write data to the write buffer 15. In this case, in step d4, the access control circuit 13 immediately transfers the write data stored in the write buffer 15 to the VRAM 20, and then, in step d5, instructs the VRAM control circuit 18 to make invalid all the effective flags 22. Whereby the sequence proceeds to step d3, and it is possible to transfer the write data of the pre-buffer 12 to the write buffer 15.

After the process of step d3, in step d6, the pre-effective flag 25 of the pre-buffer 12 is made invalid so that new write data can be written, and the sequence returns to step d1. By employing this control method, even if software makes control in a manner of uncontinuously writing data to the VRAM address, it is possible to restrict the number of write access times to VRAM 20 to the minimum, so that the power consumption of VRAM itself can be reduced.

The aforesaid embodiments are applicable to a display device of an information processing apparatus with any of combinations. In particular, these embodiments of the invention are effectively applicable to the whole of portable appliances in which it is important to lower the amount of power consumption.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A display memory control apparatus for writing data into a display memory having data lines plural times data lines for making a connection with a CPU, comprising:

a pre-buffer capable of storing addresses and data in writing data into the display memory from the CPU, for deriving a pre-buffer effective flag used as a signal for identifying whether or not addresses and data are stored therein;

a write buffer capable of storing data numerically corresponding to data lines of the display memory while dividing the data between a plurality of areas, for deriving a plurality of effective flags used as a signal for identifying whether or not effective data is stored therein corresponding to respective areas constituting the plurality of areas;

a high-order address buffer for storing a high-order address data of a predetermined number of bits on a high-order side of address;

a low-order address decoder for decoding address of a predetermined number of bits on a low-order side of address;

a high-order address comparator circuit for making a comparison between the high-order address data stored in the high-order address buffer and the high-order address of addresses of the pre-buffer;

an access control circuit for controlling a write operation to the write buffer;

a display control circuit for periodically executing read of display data from the display memory; and a display memory control circuit for controlling read and write of the display memory via the data buses corresponding to the number of display data lines, the access control circuit referring the pre-buffer effective flag and effective flags, and writing data stored in the pre-buffer into a write buffer area determined on the basis of the comparative result of the high-order address comparator circuit and an decode output of the low-order address decoder, and further, controlling the display memory control circuit so as to write data stored in the write buffer into the display memory in the case where a predetermined condition is established.

2. The display memory control apparatus of claim 1, wherein the access control circuit controls the display memory control circuit so as to immediately write data into the display memory from the write buffer in the case where the plurality of effective flags of the write buffer all indicate the presence of effective data.

3. The display memory control apparatus of claim 1 or, wherein the access control circuit controls the display memory control circuit so as to write data stored in the write buffer into the display memory in the case where a read instruction of storage contents is given to the display memory from the CPU in a state that effective data is stored in the write buffer.

4. The display memory control apparatus of claim 1 or, the display control apparatus further comprising a timer for counting a predetermined cycle time, wherein the access control circuit controls the display memory control circuit so as to write data stored in the write buffer into the display memory in the case where effective data is stored in the write buffer when the timer counts a given time.

5. The display memory control apparatus of claim 1 or, wherein the access control circuit controls the display memory control circuit so as to write data stored in the write buffer into the display memory in the case where a result from the comparison of the high-order address comparator circuit is that the high-order addresses do not coincide with each other, in a state that both the effective flag of the write buffer and the pre-buffer effective flag of the pre-buffer indicate that effective data is present.

* * * * *